Sept. 12, 1944.  M. G. GRABOWSKY  2,357,890
NET
Filed May 24, 1943
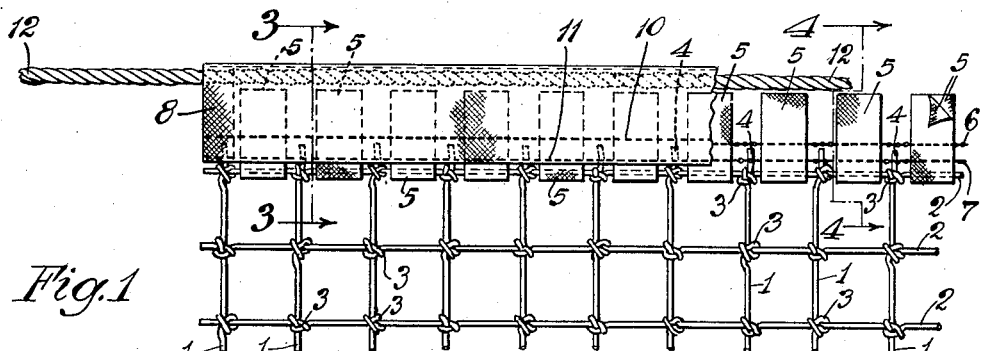
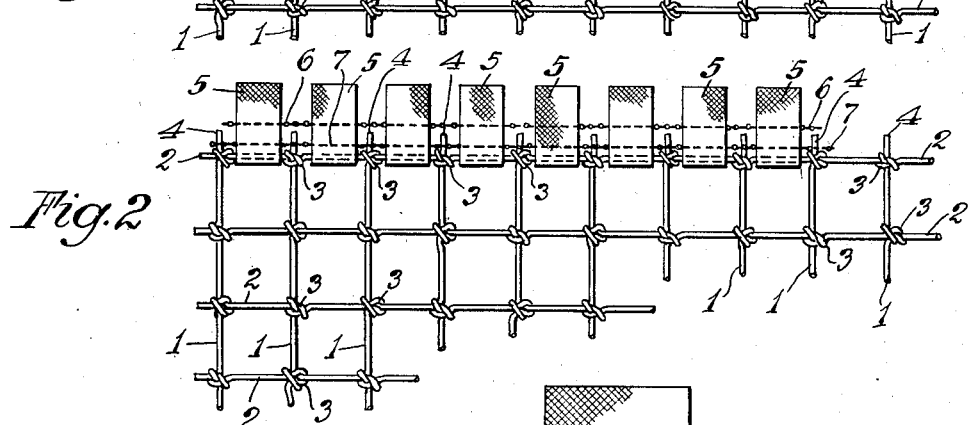
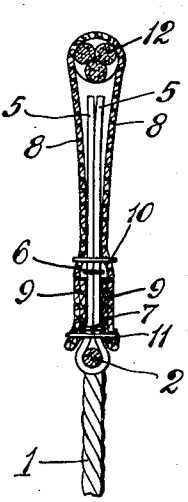
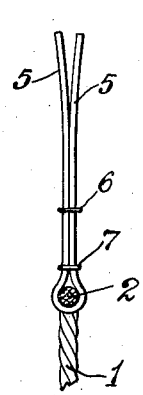
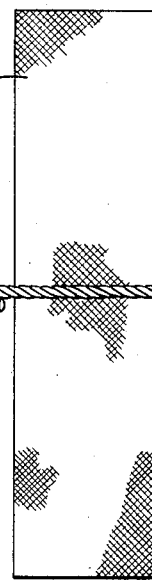
Inventor
Murray G. Grabowsky
by Parker & Carter
Attorneys.

Patented Sept. 12, 1944

2,357,890

UNITED STATES PATENT OFFICE 2,357,890

NET

Murray G. Grabowsky, Chicago, Ill., assignor R. J. Ederer Company, Chicago, Ill., a corporation of Illinois Application May 24, 1943, Serial No. 488,176

5 Claims. (Cl. 273—29)

This invention relates to a net and to the method of making a net. It has for one object to provide means and a method for attaching a reinforcement such as a tape to one edge of a net without weakening the net itself and without weakening the cords which make up the net.

Another object is to provide means and a method for attaching to one edge or one side of a net means for supporting it without weakening the net or any part of it.

Other objects will appear from time to time throughout the specification and claims.

This invention is illustrated more or less diagrammatically in the accompanying drawing, wherein:

Figure 1 is an elevation of a top or edge of a net with parts removed and parts broken away.

Figure 2 is a view similar to Figure 1, showing the net in an intermediate stage of its manufacture.

Figure 3 is a transverse sectional detail taken on an enlarged scale at line 3—3 of Figure 1.

Figure 4 is a transverse section taken on an enlarged scale at line 4—4 of Figure 1.

Figure 5 is a plan view illustrating a portion of the net and a tab at one stage of the manufacture.

Like parts are indicated by like characters throughout the specification and the drawing.

In the particular form shown herewith, the net is formed of transverse cords, threads or strings 1, 1 which are associated with longitudinal cords, threads or strings 2, 2. The transverse and longitudinal cords, threads or strings are joined, for example, by knots 3, 3 at their points of intersection. As shown herewith, a portion or section of net is manufactured by fastening transverse and longitudinal cords, threads or strings together, and preferably short ends 4 of the transverse cords, threads or strings extend outwardly as shown in the figures. They extend outwardly beyond the outermost or uppermost longitudinal member 2.

After a net of the desired size has been formed, fabric tabs 5 are positioned, preferably one in each mesh, about the uppermost or outermost member 2. The tabs are positioned about the members 2 as shown in Figure 5, and are then folded together to occupy the position shown in Figures 1 and 2.

After the tabs 5 are in position, one or more rows of stitches 6, 7 are formed and as shown particularly in Figures 1, 2, 3 and 4, these rows of stitchings 6, 7 engage the tabs. The uppermost or outermost row of stitching 6 engages only the tabs 5, while the lowermost or innermost row of stitching 7 engages or may engage not only the tabs 5 but also the loose ends 4 of the transverse cords, threads or strings.

After the net as shown in Figure 2 has been made with the tabs 5 in place, a final finishing member may be put in place and if used this member preferably comprises a length of fabric which is folded upon itself to form folds 8, 8, and these folds may have inwardly turned edges 9, 9. The folds are secured to the net by one or more rows of stitching 10, 11. As shown, the uppermost or outermost row of stitching 10 engages the tabs and nothing more, while the innermost or lowermost row of stitching 11 engages the tabs and may also engage the loose ends 4 of the members 1.

If desired, a cord or rope 12 may be positioned between the folds 8, 8, and thus it serves as a means of supporting the net. The rope may be put into place between the folds before they are stitched together, or it may be threaded through after the folds have been stitched together and of course, if desired, the rope 12 may be entirely omitted.

Although I have shown an operative form of my invention, it will be recognized that many changes in the form, shape, and arrangement of parts can be made without departing from the spirit of the invention, and my showing is therefore to be taken as, in a sense, diagrammatic.

In particular, while the invention is shown as embodied in a net such as may be used for tennis, it is not limited to that purpose and might be embodied in any net for any purpose. While the invention is shown in connection with a net, it is to be understood that the invention may be applied in connection with any relatively loosely formed fabric. The tabs 5 or their equivalents might be positioned in the open meshes or other openings of almost any type of fabric, and the other details of the construction shown would be followed. The general advantage of the invention, which is to prevent sewing through the cords or threads of the fabric where they are under load and therefore weakening them, can be present in a structure made of many different sorts of fabric. The invention is not limited to any particular material, and the net or fabric may be formed of animal or vegetable fibers or of synthetic materials.

The use and operation of this invention are as follows:

The net or fabric is formed in any desired manner. It may be formed by weaving or knotting or otherwise. Whatever the form of the fabric, openings or meshes are formed and through these the tabs are positioned. While a tab is shown in each mesh, this is not necessary, and tabs might be positioned only in alternate meshes or only in an occasional mesh. The form of tabs which is to be used will depend largely upon the size and weight of the fabric.

After the fabric has been formed, the desired number of tabs is inserted through the openings or meshes. The tabs are folded together and are then stitched together. One or more rows of stitching may be used. As shown, two have been used, but one may suffice and more than two may be used. It is desirable but not essential that at least one row of stitching be positioned to engage the loose ends 4 of the members 1. Since these loose ends are not ordinarily load engaging parts, the fact that stitches pass through then and therefore to some degree weaken them is unimportant and does not weaken the structure as a whole.

After the desired rows of stitches have been formed in the tabs, the final covering band is placed in position and is stitched also. The stitches engage the tabs and may, if desired, also engage the loose ends 4. As in the case of the stitches 6 and 7, there may be one row of stitches 11 or 10, or there may be several such rows of stitches.

The tab construction as illustrated herewith is applied only to one edge of the net, but it may be applied to all edges or to more than one. In general, the advantage of the tab construction shown is that it provides means for securing a final edging or band to a structure and for stitching the parts together without forming any stitches which pass through the load-carrying members of the fabric itself, and therefore, without weakening any of the load-carrying members of the fabric.

I claim:

1. A composite net article comprising a section of large mesh material having an edge and a plurality of tabs positioned in the meshes of said material and folded with their ends extending outwardly beyond the edge of said material, and stitch means extending through said tabs, said stitch means being positioned outwardly from the edge of said material, and a strip of reinforcing material with its edge embracing said tabs, there being stitching formed in said reinforcing material and engaging said tabs and being out of contact with said large mesh material.

2. A composite net article comprising a section of large mesh material having an edge and a plurality of tabs positioned in the meshes of said material and folded with their ends extending outwardly beyond the edge of said material, and stitch means extending through said tabs, said stitch means being positioned outwardly from the edge of said material, and a strip of reinforcing material folded upon itself with its edges embracing said tabs, there being stitching formed in said reinforcing material and engaging said tabs and being out of contact with said large mesh material.

3. A composite net article comprising a section of large mesh material having an edge and a plurality of tabs positioned in the meshes of said material and folded with their ends extending outwardly beyond the edge of said material, and stitch means extending through said tabs, said stitch means being positioned outwardly from the edge of said material, and a strip of reinforcing material folded upon itself, there being stitching formed in said reinforcing material and joining the edges of said reinforcing material and engaging said tabs and being out of contact with said large mesh material.

4. A composite net article comprising a section of large mesh material having an edge and a plurality of tabs positioned in the meshes of said material and folded with their ends extending outwardly beyond the edge of said material, and stitch means extending through said tabs at a plurality of points, said stitch means being positioned outwardly from the edge of said material, and a strip of reinforcing material folded upon itself with its edges embracing said tabs, there being stitching formed in said reinforcing material and joining the edges of said reinforcing material and engaging said tabs and being out of contact with said large mesh material.

5. A composite net article comprising a section of net material having an edge and a plurality of fabric tabs positioned in the meshes of said net article along said edge and folded with their ends extending outwardly beyond the edge of said net, and means through said tabs positioned outwardly beyond the edge of said net for holding said tabs in place, and a strip of reinforcing material extending over said tabs, and means positioned outwardly beyond the edge of said net, extending through said reinforcing material and through said tabs, and securing the tabs to the reinforcing means, said securing means being positioned outwardly beyond the edge of said material.

MURRAY G. GRABOWSKY.